US010083629B2

(12) United States Patent
Simoes et al.

(10) Patent No.: US 10,083,629 B2
(45) Date of Patent: Sep. 25, 2018

(54) SYNTHETIC VAGINAL CUFF MODEL AND METHOD OF SIMULATING VAGINAL CUFF CLOSURE

(71) Applicants: Mario Alves Simoes, Pinellas Park, FL (US); Stuart Richard Hart, Tampa, FL (US); Omar Carambot, Orlando, FL (US); Mark Evans Armstrong, Tampa, FL (US)

(72) Inventors: Mario Alves Simoes, Pinellas Park, FL (US); Stuart Richard Hart, Tampa, FL (US); Omar Carambot, Orlando, FL (US); Mark Evans Armstrong, Tampa, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 15/195,418

(22) Filed: Jun. 28, 2016

(65) Prior Publication Data

US 2017/0039892 A1 Feb. 9, 2017

Related U.S. Application Data

(60) Provisional application No. 62/186,961, filed on Jun. 30, 2015.

(51) Int. Cl.
*G09B 23/28* (2006.01)
*G09B 23/30* (2006.01)

(52) U.S. Cl.
CPC ........... *G09B 23/281* (2013.01); *G09B 23/30* (2013.01)

(58) Field of Classification Search
USPC ................. 434/262, 267, 272, 273
See application file for complete search history.

(56) References Cited

U.S. PATENT DOCUMENTS

| | | | | |
|---|---|---|---|---|
| 4,195,420 A | * | 4/1980 | Fields | G09B 23/30 434/273 |
| 5,472,345 A | * | 12/1995 | Eggert | G09B 23/281 434/273 |
| 6,592,515 B2 | | 7/2003 | Thierfelder et al. | |
| 7,322,826 B2 | | 1/2008 | Zeeff | |
| 7,553,159 B1 | * | 6/2009 | Arnal | G09B 23/281 434/267 |

(Continued)

OTHER PUBLICATIONS

Fahrig, R. et al. A three-dimensional cerebrovascular flow phantom, Medical Physics. Aug. 1999, 26 (8): 1589-1599.

(Continued)

*Primary Examiner* — Kurt Fernstrom
(74) *Attorney, Agent, or Firm* — Nilay J. Choksi; Smith & Hopen, P.A.

(57) ABSTRACT

A vaginal cuff surgical model and methods of manufacture and use thereof. The model includes a body (resembling a vaginal cuff) and appendages (resembling uterosacral ligaments) extending from the body. The model (body and appendages) is formed of silicone, rubber, a polymer, or other suitable material with one or more layers of mesh embedded within the polymeric material. The embedded mesh permits suture between the components of the model. The surgical model permits surgical practice of this important component of a total hysterectomy procedure via suturing across the model and to the appendages.

12 Claims, 7 Drawing Sheets

(56) References Cited

U.S. PATENT DOCUMENTS

| | | | |
|---|---|---|---|
| 7,866,983 B2* | 1/2011 | Hemphill | G09B 23/34 434/262 |
| 7,901,346 B2 | 3/2011 | Kovac et al. | |
| 8,636,643 B2 | 1/2014 | Kovac et al. | |
| 9,373,270 B2* | 6/2016 | Miyazaki | G09B 23/281 |
| 9,830,834 B2* | 11/2017 | Miyazaki | G09B 23/34 |
| 2008/0113324 A1* | 5/2008 | Ishii | A61B 17/00 434/272 |
| 2010/0168784 A1 | 7/2010 | Pustilnik | |
| 2014/0148640 A1 | 5/2014 | Thierfelder et al. | |

OTHER PUBLICATIONS

Kerber, Charles W. et al. Flow Dynamics in the Human Carotid Artery: I. Preliminary Observations Using a Transparent Elastic Model. American Journal of Neuroradiology, Jan./Feb. 1992, 13:173-180.

Ecoflex Series Super-Soft, Addition Cure Silicone Rubbers. Product Overview. Smooth-on, Inc. www.smooth-on.com.

3-Dmed. Learning Through Simulation. https:\\www.3-dmed.com/product/soft-tissue-suture-pad. Accessed on Oct. 1, 2015.

SimuLab. Improve Your Suturing Skills. Student Suturing Packages. http:\\simulab.com/tools-improve-suturing-skills. Accessed on Oct. 1, 2015.

SimVivo. Sim*Suture. http:\\sim-vivo.com/simsuture.html. Accessed on Oct. 1, 2015.

SynDaver Labs. Synthetic Human Tissues & Body Parts. http:\\syndaver.com/shop/syndaver/anatomy-model/. Accessed on Oct. 1, 2015.

SurgiReal. Better Education. Better Outcomes. Catalog. http:\\surgireal.com/collections/all/products/0150 and http:\\surgireal.com/collection/all/products0100. Accessed on Oct. 1, 2015.

SynDaver Labs. Synthetic Human Tissues & Body Parts. http:\\syndaver.com/shop/syntissue/adult-skin/. Accessed on Oct. 1, 2015.

* cited by examiner

SYNTHETIC VAGINAL CUFF MODEL AND METHOD OF SIMULATING VAGINAL CUFF CLOSURE

CROSS-REFERENCE TO RELATED APPLICATIONS

This nonprovisional application is a continuation of and claims priority to U.S. Provisional Patent Application No. 62/186,961, entitled "Synthetic Vaginal Cuff Model", filed Jun. 30, 2015 by the same inventors, the entirety of which is incorporated herein by reference.

BACKGROUND OF THE INVENTION

1. Field of the Invention

This invention relates, generally, to medical devices for surgical training. More specifically, it relates to methods and apparatuses for modelling vaginal cuffs and simulating surgical procedures pertaining to vaginal cuffs.

2. Brief Description of the Prior Art

Methods and apparatuses are known in the art for supporting vaginal cuffs, particularly after a hysterectomy and/or for the treatment or prevention of prolapse. For example, U.S. Pat. No. 8,636,643 to Kovac et al teaches a device for use in supporting posterior vaginal tissue in a patient without a uterus. The device includes implants that contact the patient's vaginal cuff and connect to the patient's sacral anatomy. Similarly, U.S. Patent Application Publication No. 2014/0148640 teaches a device for treatment or prevention of vaginal prolapse. The device includes two (2) flat strips that connect the vaginal cuff to sacral anatomy.

U.S. Patent Application Publication No. 2010/0168784 discusses a device for occluding the vaginal cuff in order to prevent fluid from flowing through the vagina. The device includes a head portion that is inserted into the vagina and an expandable portion coupled to the head portion, where the expandable portion expands within the vagina, thus occluding the vaginal cuff and sealing off the vagina during a surgical procedure in order to prevent fluids from flowing past the expandable portion and the vaginal wall.

However, to perform complex post-hysterectomy surgical techniques, such as reattaching and/or cardinal ligaments to support the vaginal cuff and prevent vaginal vault prolapse, sufficient training is required, as many complications can arise. The foregoing disclosures, along with the conventional art as a whole, fail to provide a safe and effective manner of practicing post-hysterectomy surgical techniques, particularly when attempting to reattach the uterosacral and/or cardinal ligaments to support the vaginal cuff.

Accordingly, what is needed is an ex vivo surgical model or simulation for reattaching uterosacral and/or cardinal ligaments post-hysterectomy in order to support the vaginal cuff. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for a vaginal cuff model and method of training for a cuff closure procedure is now met by a new, useful, and nonobvious invention.

In an embodiment, the current invention is a vaginal cuff surgical model. The model includes a rounded body resembling a vaginal cuff of an animal, where the rounded body has a hollow interior and at least one open end. The rounded body can be formed of a polymeric material (e.g., silicone, rubber, foam, or a combination) with an embedded layer of mesh (e.g., nylon tulle netting mesh) disposed along the rounded body in a first position suitable for suture. The model further includes an appendage resembling a uterosacral ligament extending from the rounded body at a lateral angle of the rounded body. The appendage is also formed of a polymeric material (e.g., silicone, rubber, foam, or a combination) with an embedded layer of mesh (e.g., nylon tulle netting mesh) disposed along the appendage in a second position suitable for suture. The embedded layers of mesh are structured to receive suture therebetween to affix the appendage to the rounded body. The mesh may be embedded about 1-2 mm below an outer surface of the appendage and/or rounded body. Optionally, the model may further include a resin or liquid silicone binder as well.

In a separate embodiment, the current invention is a method of manufacturing a vaginal cuff surgical model. A first polymeric material is provided in a mold of a rounded body that mimics a vaginal cuff of an animal, and a second polymeric material is provided in a mold of an appendage that mimics a uterosacral ligament of the animal. Layers of mesh are embedded into both polymeric materials, possibly at about 1-2 mm below their respective outer surface. The mesh is structure to receive suture therebetween in order to affix the polymeric materials together (e.g., the first polymeric material with mesh can be detachably coupled to the second polymeric material with mesh). and to permit suture training. Optionally, a resin or liquid silicone binder may be applied to the polymeric materials and/or mesh layers.

In a separate embodiment, the current invention is a method of simulating a vaginal cuff closure surgical procedure. A suture pad stand is provided having a base component and an angled component, where the two components are hingedly coupled to each other and have a plurality of stable, angled positions. Optionally, the stand can be placed in a laparoscopic enclosure to mimic an abdominal cavity. A vaginal cuff suture pad is positioned on the angled component of the stand, and the suture pad has a plurality of vaginal cuff models affixed thereto, each including a simulated cuff component and two (2) simulated uterosacral ligament components extending from the cuff component. The stand is angled in one of the stable positions, and the simulated vaginal cuff closure surgical procedure can be performed on each vaginal cuff model by suturing one side of each cuff model and suturing across the cuff model. Optionally, the surgeon can suture to the two (2) simulated uterosacral ligament components as well, if the training protocol calls for it. subsequently, the vaginal cuff suture pad can be removed from the stand, and the stand can be re-used with another suture pad.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a", "an", and "the" include plural referents unless the content clearly dictates otherwise. As used in this specification and the appended claims, the term "or" is generally employed in its sense including "and/or" unless the context clearly dictates otherwise.

As used herein, "about" means approximately or nearly and in the context of a numerical value or range set forth means ±15% of the numerical.

As used herein "animal" means a multicellular, eukaryotic organism classified in the kingdom Animalia or Metazoa. The term includes, but is not limited to, mammals. Non-limiting examples include rodents, aquatic mammals, domestic animals such as dogs and cats, farm animals such as sheep, pigs, cows and horses, and humans. Wherein the terms "animal" or "mammal" or their plurals are used, it is contemplated that it also applies to any animals.

As used herein the term "patient" is understood to include an animal, especially a mammal, and more especially a human that is receiving or intended to receive treatment.

Figure 1:
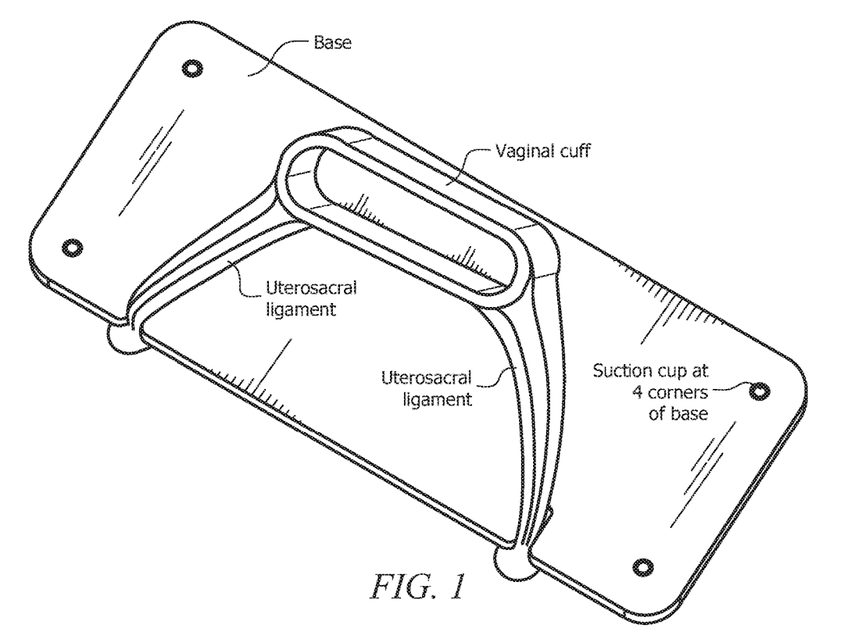
FIG. 1 depicts an embodiment of the current invention.
Figure 2A:
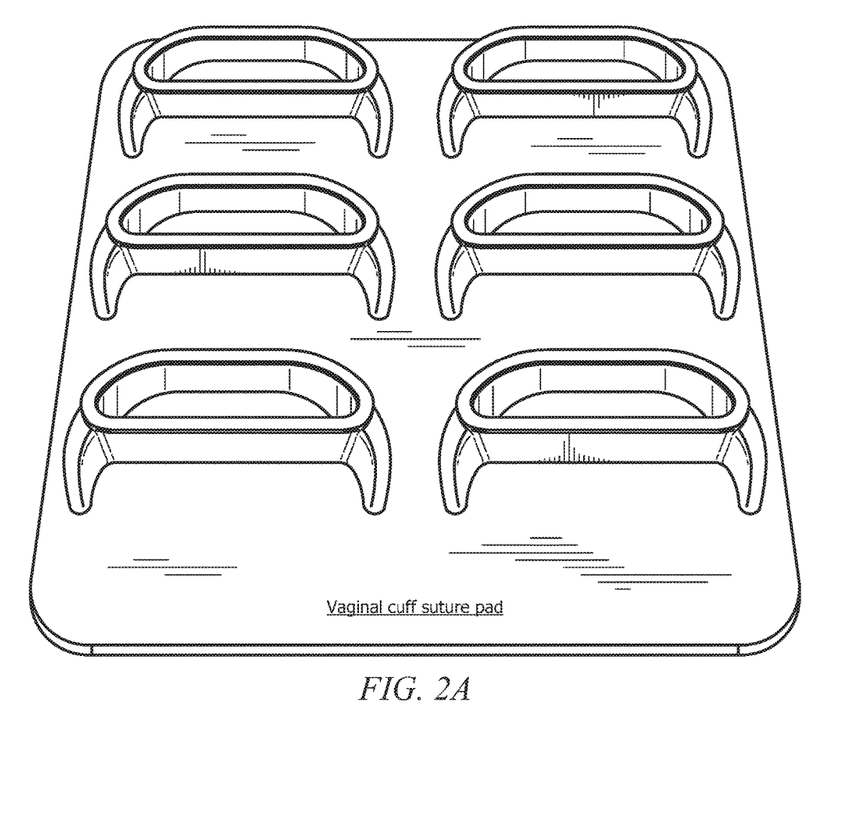
FIG. 2A depicts an alternate embodiment of the current invention as part of a vaginal cuff suture pad.
Figure 2B:
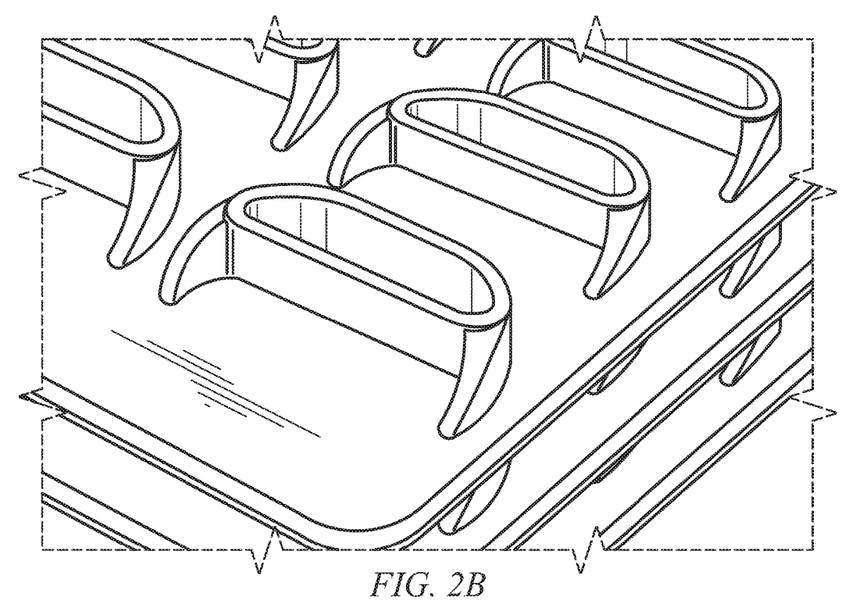
FIG. 2B is a closer-up view of the embodiment of FIG. 2A.

In an embodiment, the current invention is a vaginal cuff surgical model with uterosacral ligaments. The surgical model is formed of silicon, rubber, foam, or other suitable material with mesh embedded and/or layered therein. The model, as seen in FIGS. 1-2, mimics a vaginal cuff having integrated ligaments for adhesion to the base of the model. The integrated mesh in the model allows suturing of the features without ripping out of the sutured area, similar to that seen in FIGS. 3A-3C.

Examples of materials that can be used to form the surgical model include, but are not limited to, Polyacrylate Rubber, Ethylene-acrylate Rubber, Polyester Urethane, Bromo Isobutylene Isoprene, Polybutadiene, Chloro Isobutylene Isoprene, Chlorosulphonated Polyethylene, Polychloroprene, Epichlorohydrin, Ethylene Propylene, Ethylene Propylene Diene Monomer, Polyether Urethane, Perfluorocarbon Rubber, Fluoro Silicone, Fluorocarbon Rubber, Hydrogenated Nitrile Butadiene, Polyisoprene, Acrylonitrile Butadiene, Polyurethane, Styrene Butadiene, Styrene Ethylene Butylene Styrene Copolymer, Polysiloxane, Vinyl Methyl Silicone, Acrylonitrile Butadiene Carboxy Monomer, Styrene Butadiene Carboxy Monomer, Thermoplastic Polyetherester, Styrene Butadiene Block Copolymer, Styrene Butadiene Carboxy Block Copolymer. In some instances, the material is layered to simulate fascia. Inclusion of specific mesh material can further simulate the fascia. In specific embodiments, the model can be printed using a 3-dimensional printer.

The embedded mesh can be formed of plastic or other polymer or suitable material.

Surgical Procedure

A common problem encountered during both vaginal and abdominal hysterectomies is vaginal prolapse post-hysterectomy. During a hysterectomy, the uterosacral-cardinal ligament complex must be detached from the uterus. Subsequently, the uterosacral-cardinal ligament complex can be reattached to the vaginal cuff to reduce risk of vaginal prolapse. This reattachment is important to provide support to the vaginal cuff so that prolapse does not occur. This reattachment procedure can occur prior to removal of the uterus or after removal of the uterus, depending on the surgeon and planned procedure. If the hysterectomy is taking place because of prolapse, the uterosacral ligaments may need to be shortened to reduce, eliminate, or otherwise repair any laxity prior to reattachment to the vaginal cuff. A similar procedure can be performed with the cardinal ligament. Each of these methodologies are known in the art for supporting the vaginal cuff post-hysterectomy.

EXAMPLE

Method of Fabrication

Nylon tulle netting mesh was placed into a mold resembling a vaginal cuff with uterosacral ligaments, and silicone rubber was poured to create a multi-layered model. The resulting model has the representation of fascia due to the mesh layer(s) located 1-2 mm below the surface of the silicone. The model combines several layers that mimic closely what one would find in real skin at that vaginal cuff anatomy. The layers are reinforced to tolerate tension and pulling while suturing and practicing other procedures.

Silicone rubber or foam or a combination of the two are layered with mesh in order to simulate the vaginal cuff with uterosacral ligaments. A resin, or liquid silicone, can be added and allowed to bond the layers.

EXAMPLE

Surgical Model

Figure 3A:
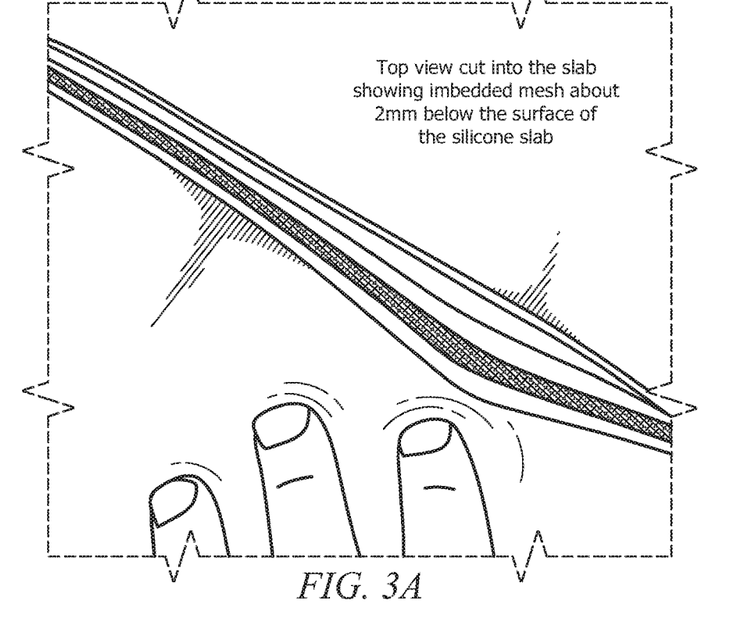
FIG. 3A is an image showing a cut made into a mesh-silicone model, showing the embedded mesh about 2 mm below the surface of the silicone.
Figure 3B:
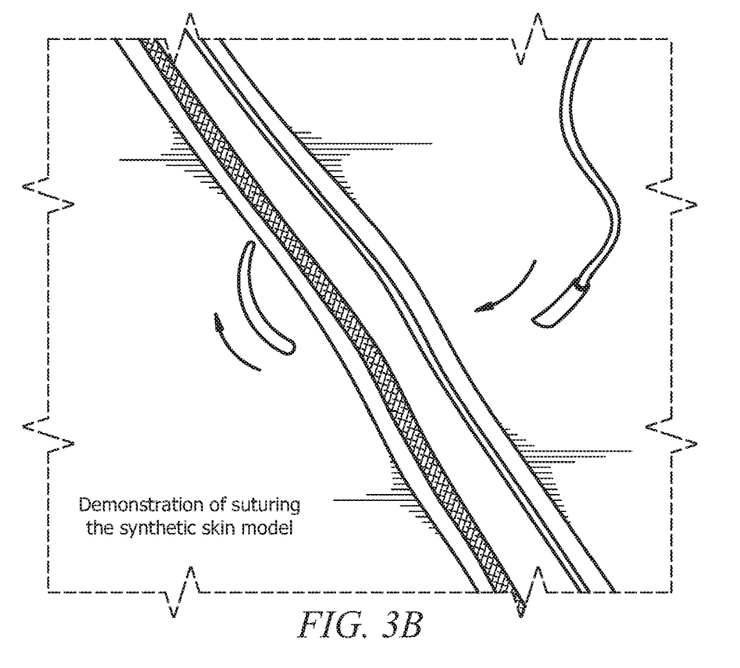
FIG. 3B is an image showing initial suturing of the model of FIG. 3A.
Figure 3C:
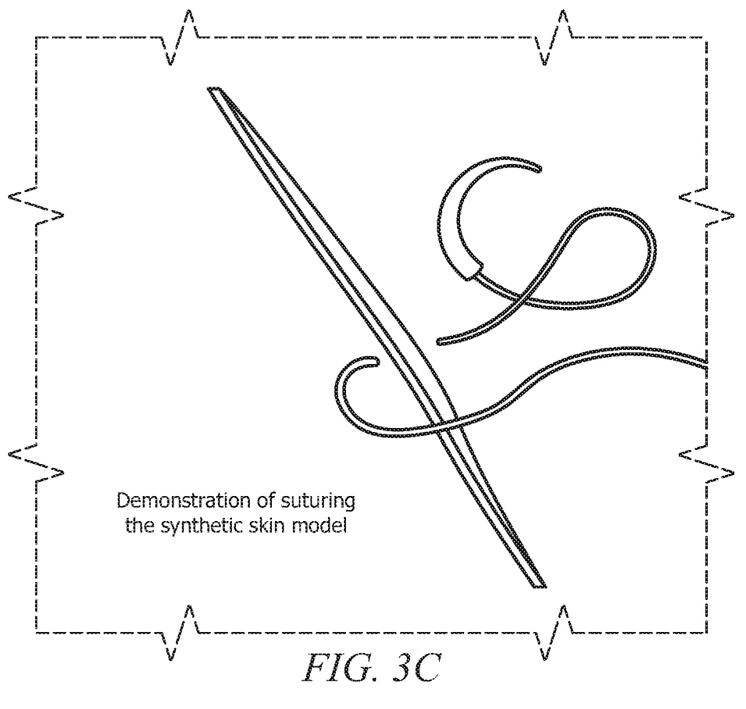
FIG. 3C is an image showing further suturing of the model of FIG. 3B.

As can be seen in FIGS. 1-2, the surgical model mimics the appearance of a vaginal cuff with uterosacral ligaments extending from the lateral angles of the vaginal cuff. In the model, the uterosacral ligaments are prefabricated and molded into the silicone, in which case the surgeon can opt to cut them if necessary. It is also envisioned that the uterosacral ligaments can be detachable from the body of the vaginal cuff. The uterosacral ligaments can then be sutured to the body of the vaginal cuff using the embedded mesh, as indicated in FIGS. 3A-3C. Optionally, cardinal ligaments (not shown) can be included in the surgical model according to the current invention.

In this surgical model, the suture has the ability to remain in the model and not rip, thus providing a significant benefit to the surgical team. The tension on the ligaments are similar to that of real patients. Suturing the cuff closed is similar to what would occur in an actual surgery once the uterus was removed.

In an embodiment, the surgical model can include an aluminum base (see FIG. 1) that holds the vaginal cuff in its position and has suction cups on its lower surface to secure itself to a base (e.g., countertop).

The surgical model provides a practical, tangible solution to a surgical team's ability to practice this aspect of a total hysterectomy, thus increasing chances of success during actual surgery and minimizing risk of vaginal prolapse post-hysterectomy.

EXAMPLE

Cuff Closure Simulation

Figure 4A:
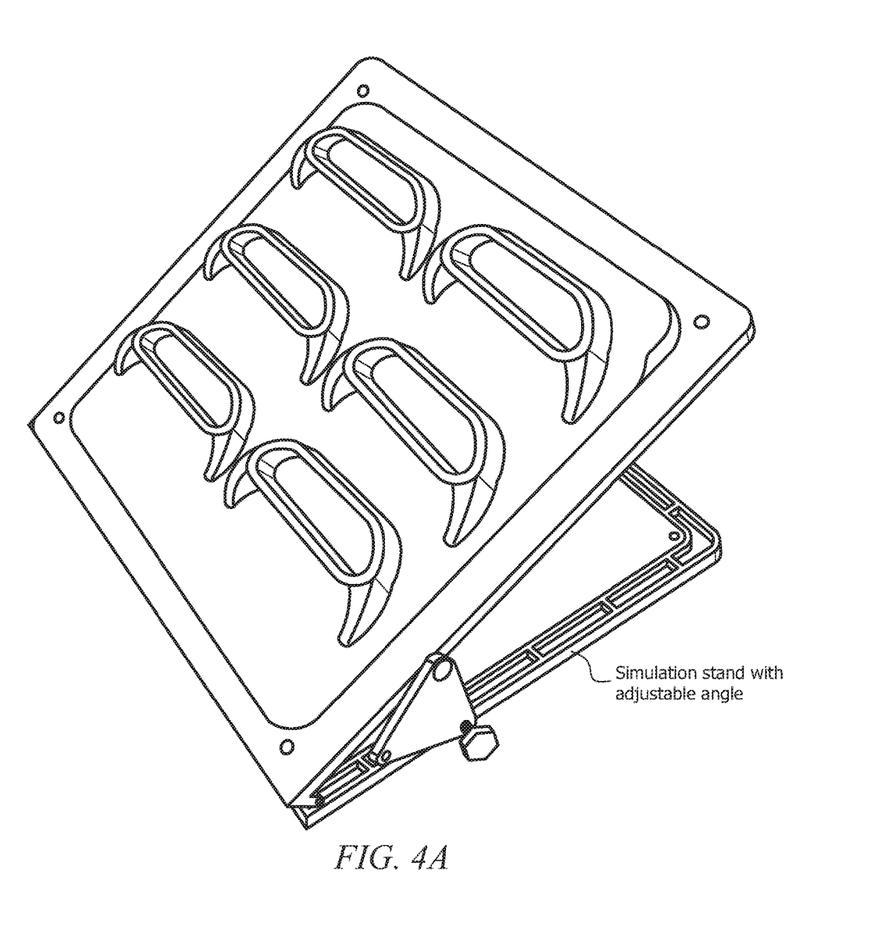
FIG. 4A depicts a vaginal cuff suture pad disposed on a simulation stand for simulating vaginal cuff closure, according to an embodiment of the current invention.
Figure 4B:
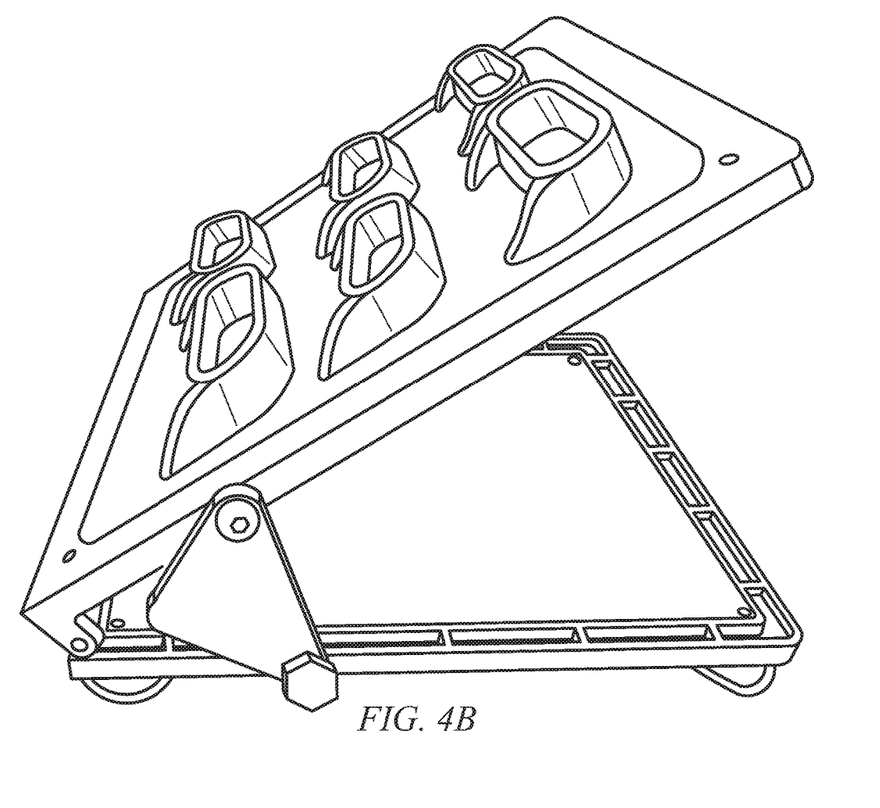
FIG. 4B is an end view of the vaginal cuff suture pad and simulation stand of FIG. 4A.

FIGS. 4A-4B depict the vaginal cuff suture pad of FIGS. 2A-2B as disposed on a hinged, simulation stand that has multiple stable, angled positions to maintain the suture pad at an angle relative the x axis. To simulate closure of a vaginal cuff, a six-cuff model is positioned on the suture pad stand. The stand is angled to the desired/preferred level; optionally, there can be three (3) distinct angled positions (as can be seen in the figures) or it can be stable at any angle. Different angles can provide for different types of training and additional challenges for the surgeon.

Optionally, the stand can be placed within a laparoscopic (e.g., SIMSEI Laparoscopic Trainer) to simulate the abdominal cavity. Alternatively, the stand can be placed upon a table or other flat surface for simulating the procedure. Once in the desired location, the suction cups (not shown in these figures but indicated in FIG. 1), can be pressed down to hold the stand and suture pad in place.

Subsequently, the surgeon can begin simulation of the cuff closure procedure of the vaginal cuff model. Utilizing laparoscopic instruments, the surgeon can suture one side of the cuff and continue suturing across the cuff. In the event that the training involves suturing to the uterosacral ligaments, each cuff model includes an extension on each side of the cuff to represent a uterosacral ligament.

This cuff closure simulation can be performed six (6) times to train effectively for the procedure with the goal being to develop a seamless integration of the cuff. Upon completion of the simulation/training, the sutures can be cut and removed, thus permitting use of the suture pad, which can then be removed from the stand, and the stand can be re-used with another suture pad including additional cuff models.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A vaginal cuff surgical model, comprising:
 a rounded body resembling a vaginal cuff of an animal, said rounded body having a hollow interior and at least one open end, said rounded body formed of a polymeric material with a first embedded layer of mesh disposed along said rounded body in a first position suitable for suture; and
 an appendage that resembles a uterosacral ligament extending from said rounded body at a lateral angle of said rounded body, said appendage formed of a polymeric material with a second embedded layer of mesh disposed along said appendage in a second position suitable for suture,
 wherein said first and second embedded layers of mesh are structured to receive suture therebetween in order to affix said appendage to said rounded body.

2. A vaginal cuff surgical model as in claim 1, further comprising:
 said polymeric material selected from the group consisting of silicone, rubber, foam, and a combination thereof.

3. A vaginal cuff surgical model as in claim 1, further comprising:
 said first and second embedded layers of mesh are formed of nylon tulle netting mesh.

4. A vaginal cuff surgical model as in claim 1, further comprising:
 said first layer of embedded mesh being embedded 1-2 mm below an outer surface of said rounded body.

5. A vaginal cuff surgical model as in claim 1, further comprising:
 said second layer of embedded mesh being embedded 1-2 mm below an outer surface of said appendage.

6. A vaginal cuff surgical model as in claim 1, further comprising:
 a resin or liquid silicone binder.

7. A method of manufacturing a vaginal cuff surgical model, comprising:
 providing a first polymeric material in a mold of a rounded body that mimics a vaginal cuff of an animal;
 embedding a first layer of mesh in said first polymeric material;

providing a second polymeric material in a mold of an appendage that mimics a uterosacral ligament of said animal;

embedding a second layer of mesh in said polymeric material, wherein said first and second embedded layers of mesh are structured to receive suture therebetween in order to affix said first and second polymeric materials together.

8. A method of manufacturing a vaginal cuff surgical model as in claim 7, further comprising:

the step of embedding said first layer of mesh including embedding said first layer of mesh 1-2 mm below an outer surface of said first polymeric material.

9. A method of manufacturing a vaginal cuff surgical model as in claim 7, further comprising:

the step of embedding said second layer of mesh including embedding said second layer of mesh 1-2 mm below an outer surface of said second polymeric material.

10. A method of manufacturing a vaginal cuff surgical model as in claim 7, further comprising:

applying a resin or liquid silicone binder to said first polymeric material and said first layer of mesh.

11. A method of manufacturing a vaginal cuff surgical model as in claim 7, further comprising:

applying a resin or liquid silicone binder to said second polymeric material and said second layer of mesh.

12. A method of manufacturing a vaginal cuff surgical model as in claim 7, further comprising:

detachably coupling said first polymeric material embedded with said first layer of mesh to said second polymeric material embedded with said second layer of mesh.

* * * * *